United States Patent
Takahama et al.

(10) Patent No.: US 6,418,038 B2
(45) Date of Patent: Jul. 9, 2002

(54) COMPLEX RESONANT DC-DC CONVERTER AND HIGH VOLTAGE GENERATING CIRCUIT DRIVEN IN A PLURALITY OF FREQUENCY REGIONS

(75) Inventors: Masanobu Takahama, Saitama; Kiyokazu Nagahara, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/878,655

(22) Filed: Jun. 11, 2001

(30) Foreign Application Priority Data

Jun. 12, 2000 (JP) .......................... 2000-175992

(51) Int. Cl.$^7$ ..................... H02M 3/335; H02M 7/5387
(52) U.S. Cl. ........................... 363/17; 363/132
(58) Field of Search ................ 363/16, 17, 21.01, 363/21.02, 97, 98, 131, 132

(56) References Cited

U.S. PATENT DOCUMENTS 5,208,738 A * 5/1993 Jain ............................ 363/17
5,835,371 A * 11/1998 Kume et al. ................ 363/132
6,324,081 B1 * 11/2001 Sakamoto et al. ........... 363/25

* cited by examiner

Primary Examiner—Matthew Nguyen
(74) Attorney, Agent, or Firm—Jay H. Maioli (57) ABSTRACT

A DC-DC converter includes a switching unit having a pair of switching devices or transistors, a resonant circuit comprising a capacitor, an inductor, and a primary coil of a converter transformer which serves as an inductor, a smoothing and rectifying circuit connected to a load in the secondary, an error amplifier for the output voltage, and a variable oscillator for varying the switching frequency according to the error voltage. The output of the variable oscillator circuit is supplied to the switching devices to provide a stabilized output voltage from the smoothing and rectifying circuit. The switching frequency during light loading is set at a frequency more than the resonant frequency which is mainly defined by the inductance and the interwinding capacitance of the secondary coil. The switching frequency to stabilize the output voltage during light loading is much higher than that during heavy loading, significantly reducing the exciting current component during light loading to enhance the energy conversion efficiency during light loading.

7 Claims, 7 Drawing Sheets

COMPLEX RESONANT DC-DC CONVERTER AND HIGH VOLTAGE GENERATING CIRCUIT DRIVEN IN A PLURALITY OF FREQUENCY REGIONS

BACKGROUND OF THE INVENTION

1. Field of the Invention

The present invention generally relates to bridge DC—DC converters incorporating high voltage generating circuits of cathode ray tubes (CRTs). More particularly, the present invention relates to a bridge DC—DC converter in which the switching frequency to stabilize an output voltage during light loading is set at a frequency greater than the resonant frequency, which is defined by the inductance of a primary coil and the interwinding capacitance of a secondary coil of a converter transformer, so that the switching frequency during light loading may be significantly higher than that during heavy loading, whereby an exciting current component which flows to the primary coil is reduced to significantly enhance the energy conversion efficiency during light loading.

2. Description of the Related Art

In recent years, attempts have been made to use, as high voltage generating circuits for generating a high voltage applied to the anode of a cathode ray tube (CRT), asynchronous high voltage generating circuits which uses a frequency asynchronous with the horizontal scanning frequency as a switching frequency.

This is because asynchronous high voltage generating circuits which use a switching frequency much higher than the horizontal scanning frequency have several benefits compared to high voltage generating circuits which use a switching frequency synchronous with the horizontal scanning frequency. That is, the circuit components constituting the asynchronous high voltage generating circuit may be compact, and the cost of the overall circuit can be reduced. Furthermore, the higher the switching frequency, the lower the exciting current required. Thus, the energy conversion efficiency can be enhanced.

Figure 6:
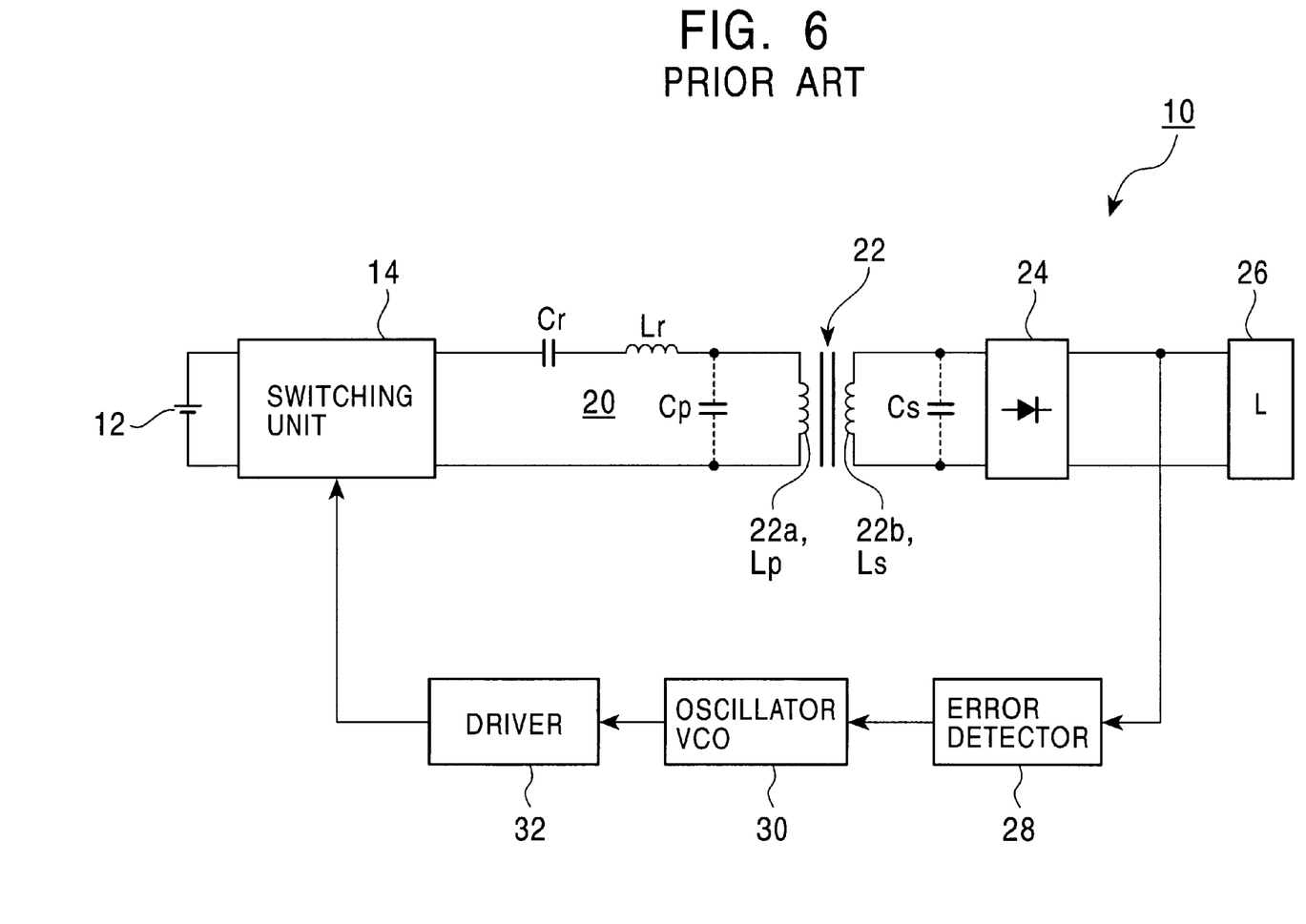
FIG. 6 is a circuit diagram of a conventional bridge DC—DC converter.

Such an asynchronous high voltage generating circuit is often implemented by, for example, a half bridge DC—DC converter. FIG. 6 illustrates the conceptual structure of a half bridge DC—DC converter 10. A dc power source 12 is connected to a switching unit 14 having a pair of switching devices, and the switching unit 14 is connected to a series circuit comprising a capacitor Cr, an inductor Lr, and a primary coil 22a of a transformer 22, which form a resonant circuit 20.

A secondary coil 22b of the transformer 22 is connected to a load 26 via a smoothing and rectifying circuit 24. The load 26 may be a CRT. When the load 26 is a CRT, the smoothing and rectifying circuit 24 may be implemented by a voltage multiplier rectifier circuit, where a high voltage of on the order of 20 to 30 kV is applied to the anode terminal of the CRT.

The high output voltage is supplied to an error detector 28, where it is compared to a reference voltage and the error voltage is supplied as a switching signal to a variable oscillator 30 to output an oscillation frequency corresponding to the error voltage. The oscillation frequency is supplied to the switching unit 14 via a driver 32. Therefore, the switching frequency which is made variable according to the load would achieve a stabilized output voltage.

In this structure, the resonance of the resonant circuit 20 is used to transfer electromagnetic energy to the secondary of the transformer 22 to provide a predetermined high output voltage HV. Herein, interwinding capacitance Cs of the secondary coil 22b which is present at primary coil 22a would be parallel to the primary coil 22a. The interwinding capacitance which is present in the primary is indicated by Cp in FIG. 6.

Figure 7:
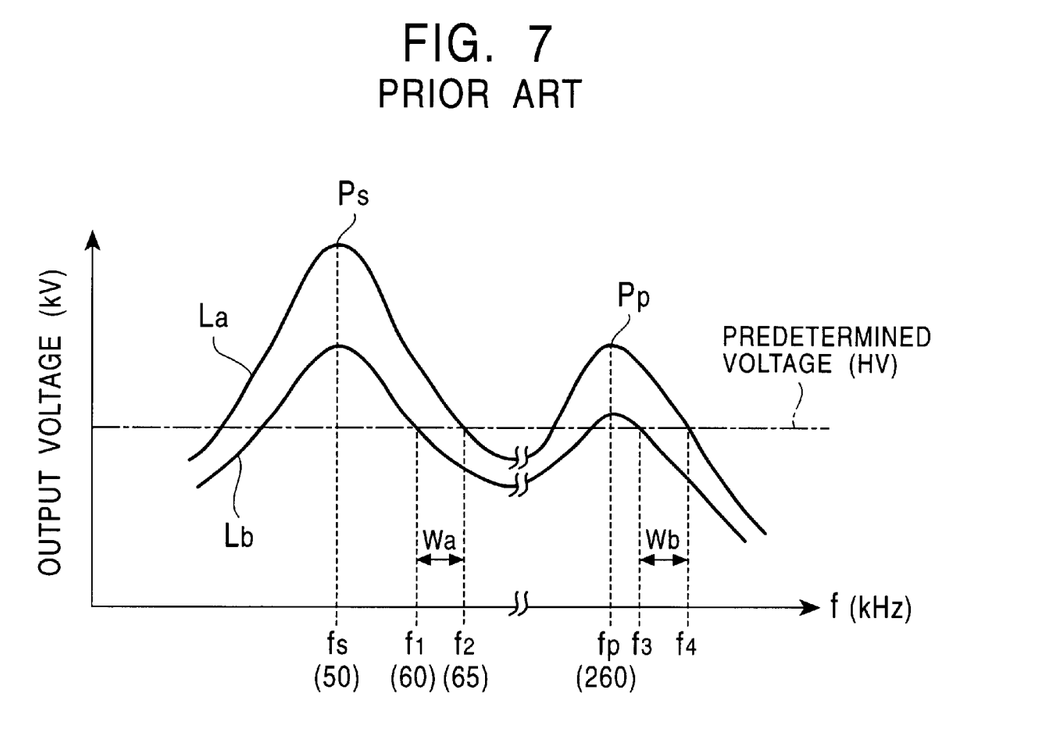
FIG. 7 is a graph showing the resonance characteristic of the conventional bridge DC—DC converter.

The relationship between the resonance characteristic when the interwinding capacitance Cs is present in the primary and the switching frequency is shown in FIG. 7. As in FIG. 6, in view of the interwinding capacitance Cs, the resonant circuit 20 would be a complex resonant circuit in which a series resonant portion comprising the capacitor Cr, the inductor Lr, and the inductance Lp of the primary coil 22a is combined with a parallel resonant portion comprising the inductor Lr, the inductance Lp, and the capacitor Cp.

The resonance characteristic is such that a first peak provided by the series resonant portion, that is, a resonance curve having a series resonant point Ps, is combined with a second peak provided by the parallel resonant portion, that is, a resonance curve having a parallel resonant point Pp. The high output voltage profile is higher when the load 26 is light-loading, while the high output voltage profile is lower when it is heavy-loading, thus proving a different resonance characteristic depending upon loading, i.e., heavy lording or light loading. That is, the resonance characteristic is represented by a curve La during light loading, while the resonance characteristic is represented by a curve Lb during heavy loading. The resonance curve varies between La and Lb depending upon load values, thereby providing a stabilized output voltage.

If a voltage for stabilization has been determined as depicted in FIG. 7, then, switching frequencies f2 and f4 corresponding to the predetermined voltage are obtained during light loading in a frequency region higher than the series resonant frequency fs and lower than the parallel resonant frequency fp, and a frequency region higher than the parallel resonant frequency, respectively. Switching frequencies f1 and f3 are obtained during heavy loading in the former and latter frequency regions, respectively.

The switching frequency of the half bridge DC—DC converter 10 is generally set higher than the resonant frequency fs corresponding to the series resonant point Ps. In this case, therefore, it is chosen to be within either frequency region Wa ranging from f1 to f2 or Wb ranging from f3 to f4. For example, the switching frequency is chosen to be within the frequency region Wa.

The electric current which flows to the resonant capacitor Cr and the resonant inductor Lr of the resonant circuit 20 shown in FIG. 6 is a combination of the current component which is transferred to the secondary and the current component which flows only to the primary, namely, the exciting current component. The exciting current component is a current component which does not contribute to electromagnetic energy transfer. The lower the switching frequency, the higher the amplitude of the exciting current component, and energy dissipation increases accordingly, as known in the art.

In the conventional DC—DC converter 10, as shown in FIG. 7, the switching frequency is operable in the frequency region Wa which is higher than the series resonant frequency fs. Here, there are only a few differences between the switching frequency f2 during light loading and the switching frequency f1 during heavy loading.

Specifically, for example, if the required high output voltage is 32 kV, this voltage corresponds to a predetermined voltage for stabilization, where when the turns of the secondary coil 22b are set at 500 T, the number of turns in the primary coil 22a is 30 T in the converter transformer 22. In this example, fs, f1, fp, and f2 are 50 kHz, 60 kHz, 65 kHz, and 260 kHz, respectively. Therefore, the switching frequency during light loading to provide stabilization at the predetermined voltage is 65 kHz, which is not significantly different from the switching frequency of 60 kHz during heavy loading.

Of course, if the desired switching frequency is set to be in the frequency region Wb higher than the parallel resonant frequency fp, the switching frequencies during light loading and heavy loading do not differ significantly.

Since the switching frequency during light loading is not high relative to during heavy loading, the DC—DC converter 10 is driven with large exciting current component, and a problem occurs in that the energy conversion efficiency of the DC—DC converter 10 is not improved. This problem occurs in half bridge DC—DC converters as well as in full bridge DC—DC converters.

SUMMARY OF THE INVENTION

Accordingly, it is an object of the present invention to provide a bridge DC—DC converter having significant improvement in the energy conversion efficiency in which the switching frequency to provide a stabilized voltage particularly during light loading is much higher than that in a conventional one.

To this end, according to one aspect of the present invention, a bridge DC—DC converter includes a switching unit having a pair of switching devices connected in series to form a bridge, a converter transformer having a primary coil and a secondary coil which are wound with a predetermined turns ratio for transferring to the secondary coil the switching output provided for the primary coil by the switching operation of the switching unit, a series resonant circuit having a capacitor, an inductor, and the primary coil serving as an inductor which are connected in series to a node between the pair of switching devices, the series resonant circuit being resonated at a first resonant frequency, a parallel resonant circuit at least having an equivalent capacitance in the primary equivalent to the interwinding capacitance of the secondary coil, and the inductance of the primary coil, the parallel resonant circuit being resonated at a second resonant frequency higher than the first resonant frequency, a voltage supply connected to the secondary coil for supplying an output voltage to a load, and a switching control unit for varying the switching frequency of the switching unit according to variations in the voltage output from the voltage supply, whereby a stabilized output voltage is obtained from the high voltage supply.

According to another aspect of the present invention, a high voltage generating circuit includes a switching unit having a pair of switching devices connected in series to form a bridge, a converter transformer having a primary coil and a plurality of secondary coils which are wound with a predetermined turns ratio for transferring to the plurality of secondary coils the switching output provided for the primary coil by the switching operation of the switching unit, a series resonant circuit having a capacitor, an inductor, and the primary coil serving as an inductor which are connected in series to a node between the pair of switching devices, the series resonant circuit being resonated at a first resonant frequency to provide current resonance for the switching operation, a parallel resonant circuit at least having an equivalent capacitance in the primary equivalent to a combination of the interwinding capacitances of the plurality of secondary coils, and the inductance of the primary coil, the parallel resonant circuit being resonated at a second resonant frequency higher than the first resonant frequency, a high voltage supply for coupling a voltage multiplier rectifier circuit to each of the plurality of secondary coils so as to connect them in series so that a high voltage is supplied to a load, and a switching control unit for varying the switching frequency of the switching unit according to variations in the high voltage output from the high voltage supply, whereby the high voltage output is stabilized.

Preferably, the turns ratio of the primary coil to the secondary coil is chosen so that the switching frequency ranges from the series resonant frequency to the parallel resonant frequency during heavy loading, and exceeds the parallel resonant frequency during light loading.

In addition, an additional capacitor may be connected in parallel to the secondary coil, of which the capacitance is chosen, so that the switching frequency may be set.

By determining the resonance characteristic during light loading in this manner, the switching frequency during light loading may be set in a frequency region higher than the parallel resonant frequency.

As a result, the switching frequency may be significantly high during light loading to reduce the amplitude of the exciting current during light loading, and the energy conversion efficiency is thus improved.

The bridge DC—DC converter according to the present invention is extremely suitably implemented as a high voltage generating circuit for use in CRTs in which a load can constantly vary in a range of heavy loading to light loading depending upon content of pictures.

DESCRIPTION OF THE PREFERRED EMBODIMENT

A bridge DC—DC converter according to the present invention is described in conjunction with its illustrative embodiments.

Figure 1:
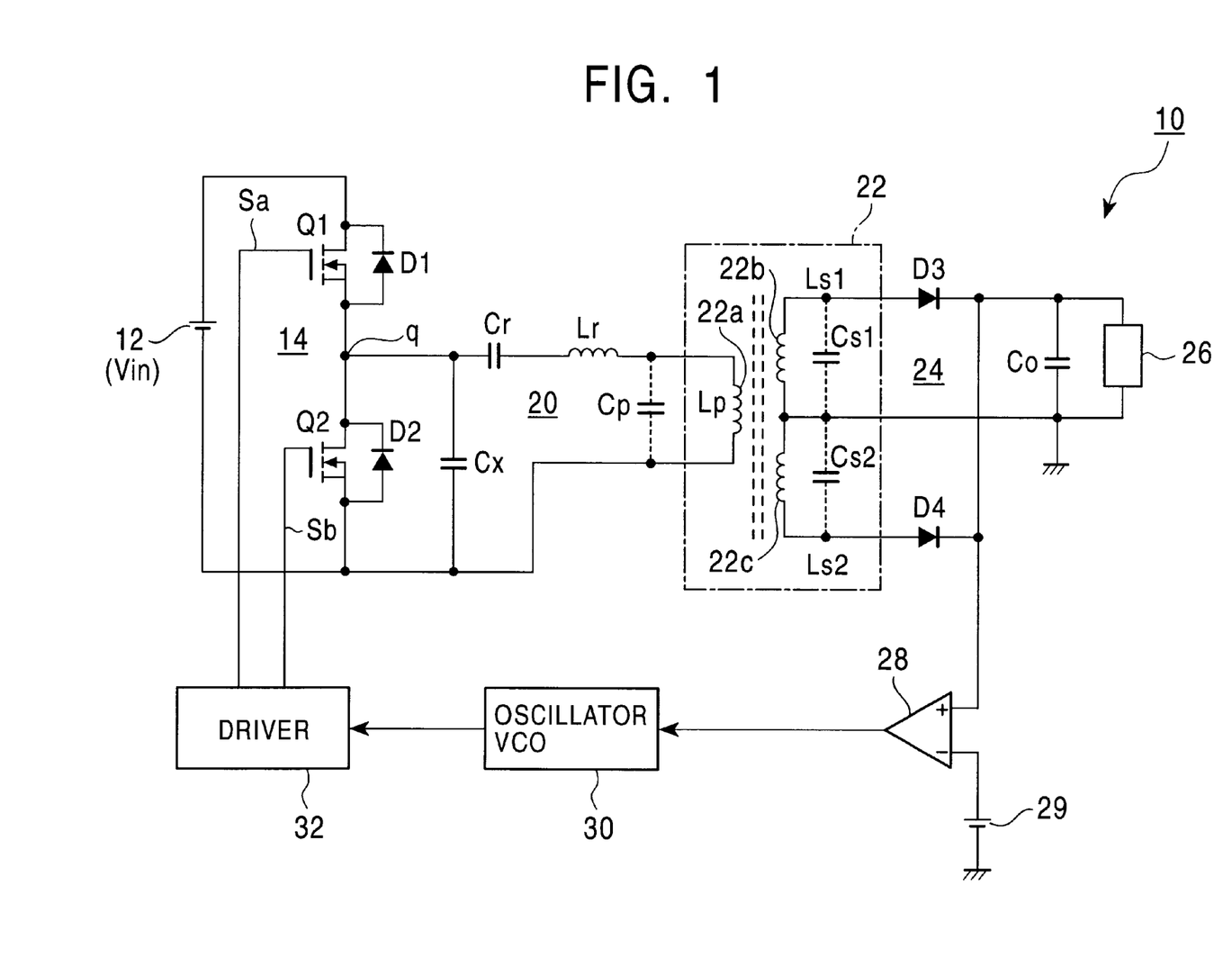
FIG. 1 is a circuit diagram of a bridge DC—DC converter according to an embodiment of the present invention.

FIG. 1 shows a half bridge DC—DC converter 10 according to the present invention, as in the conventional example shown in FIG. 6.

A switching unit 14 is disposed in the primary of a converter transformer 22 in the half bridge DC—DC converter 10.

The switching unit 14 includes a pair of switching devices, or MOS transistors Q1 and Q2 in this embodiment, which are connected in series, and switching signals Sa and Sb which are alternately inverted are supplied to the respective gates thereof from a driver 32, as will be described. The gate-source voltages are illustrated in (A) and (B) of FIG. 3, respectively.

The driving voltage from a dc power source 12 is applied to the pair of transistors Q1 and Q2. Diodes D1 and D2 for commutating a resonant current are connected between the drains and the sources of the pair of transistors Q1 and Q2, respectively. A primary coil 22a of a converter transformer 22 is connected to a node q between the pair of transistors Q1 and Q2 via resonant circuit components.

Specifically, a series resonant circuit comprising a resonant capacitor Cr, a resonant inductor Lr, and the inductance Lp of the primary coil 22a, which form a resonant circuit 20, is formed between the node q and the primary coil 22a. A capacitor Cx connected across the switching transistor Q2 is a charging/discharging capacitor, and is used for partial resonance when the switching transistors Q1 and Q2 are turned on or off.

A pair of secondary coils 22b and 22c which are connected in series is wound in the secondary of the converter transformer 22, and is connected to a pair of full-wave rectifier diodes D3 and D4, respectively, followed by a smoothing capacitor Co, to form a smoothing and rectifying circuit 24. The output voltage of the smoothing and rectifying circuit 24 is applied to a load 26 in this embodiment.

Figure 2:
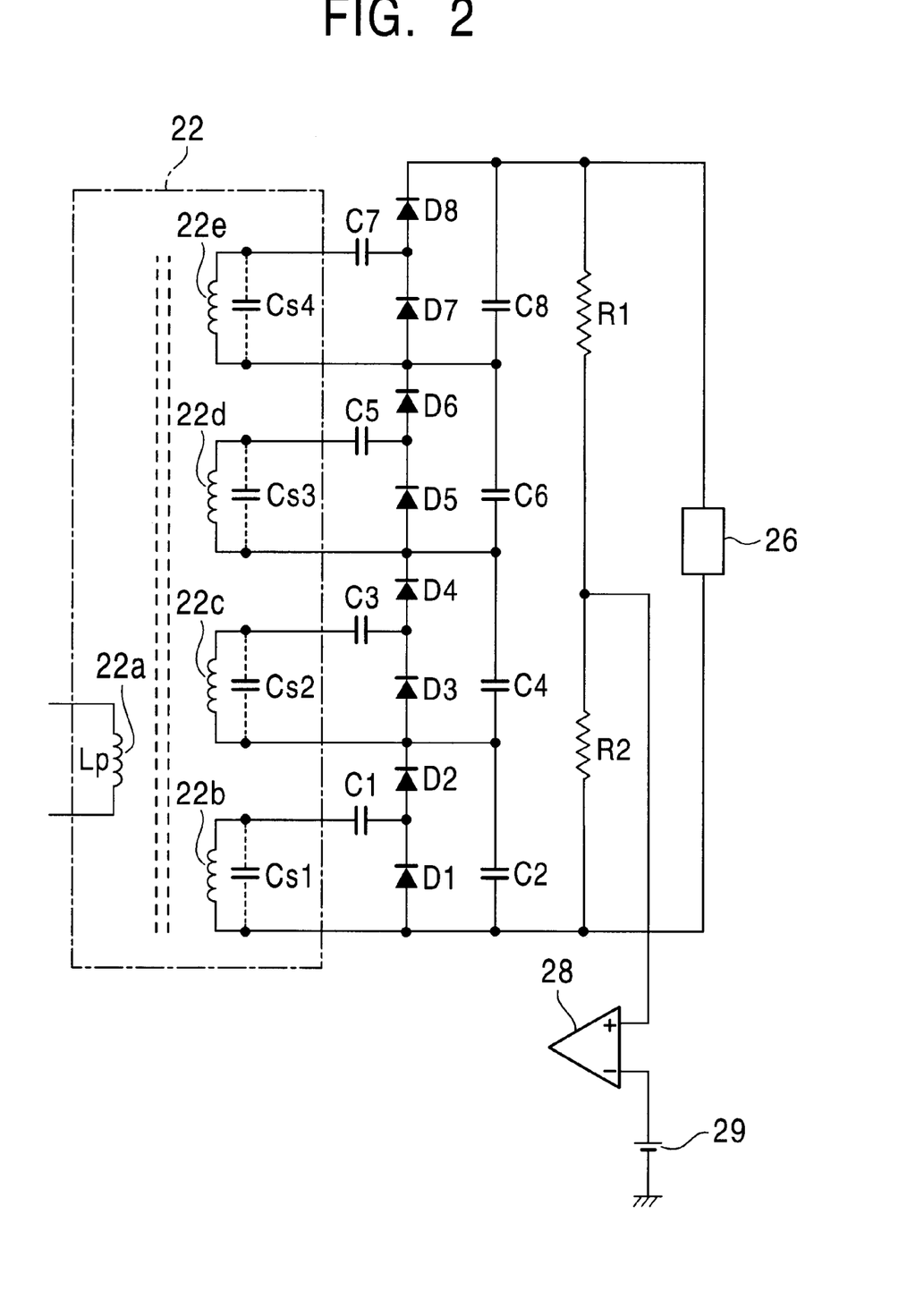
FIG. 2 is a circuit diagram of a bridge DC—DC converter according to the embodiment of the present invention in which a voltage multiplier rectifier circuit which is connected to a CRT is provided in the secondary of a converter transformer.

If the load 26 is the anode electrode of a CRT, as shown in FIG. 2, multiple sets of secondary coils 22b to 22e and voltage multiplier rectifier circuits which are connected in series are provided so that the anode voltage may maintain a high voltage of 20 kV to 32 kV voltage as is known in the art. The voltages provided for the secondary coils 22b to 22e are rectified by the voltage multiplier rectifier circuit, and the resulting voltages accumulate to boost the voltage so as to output a high output voltage HV. In this case, the secondary coils 22b to 22e parasitically contain interwinding capacitances Cs1 to Cs4, respectively.

A low output voltage would be directly supplied to an error amplifier 28 formed by an operational amplifier for comparison with a reference voltage 29, as shown in FIG. 1. A high output voltage would be supplied to the error amplifier 28 via a pair of voltage-dividing resistors R1 and R2, where it is then compared with the reference voltage 29, as shown in FIG. 2. The error voltage which is a comparative voltage is supplied as a frequency control voltage for a variable oscillator 30 for controlling the frequency of an oscillation signal according to the input error voltage. In this embodiment, the oscillation frequency may vary in a range of 100 kHz to 260 kHz. The oscillation signal is supplied to the driver 32, and is distributed as a pair of switching signals Sa and Sb, which are alternately inverted, for suitably switching a pair of switching transistors Q1 and Q2. The pair of switching signals Sa and Sb are applied to the gates of the switching transistors Q1 and Q2, respectively.

Figure 3:
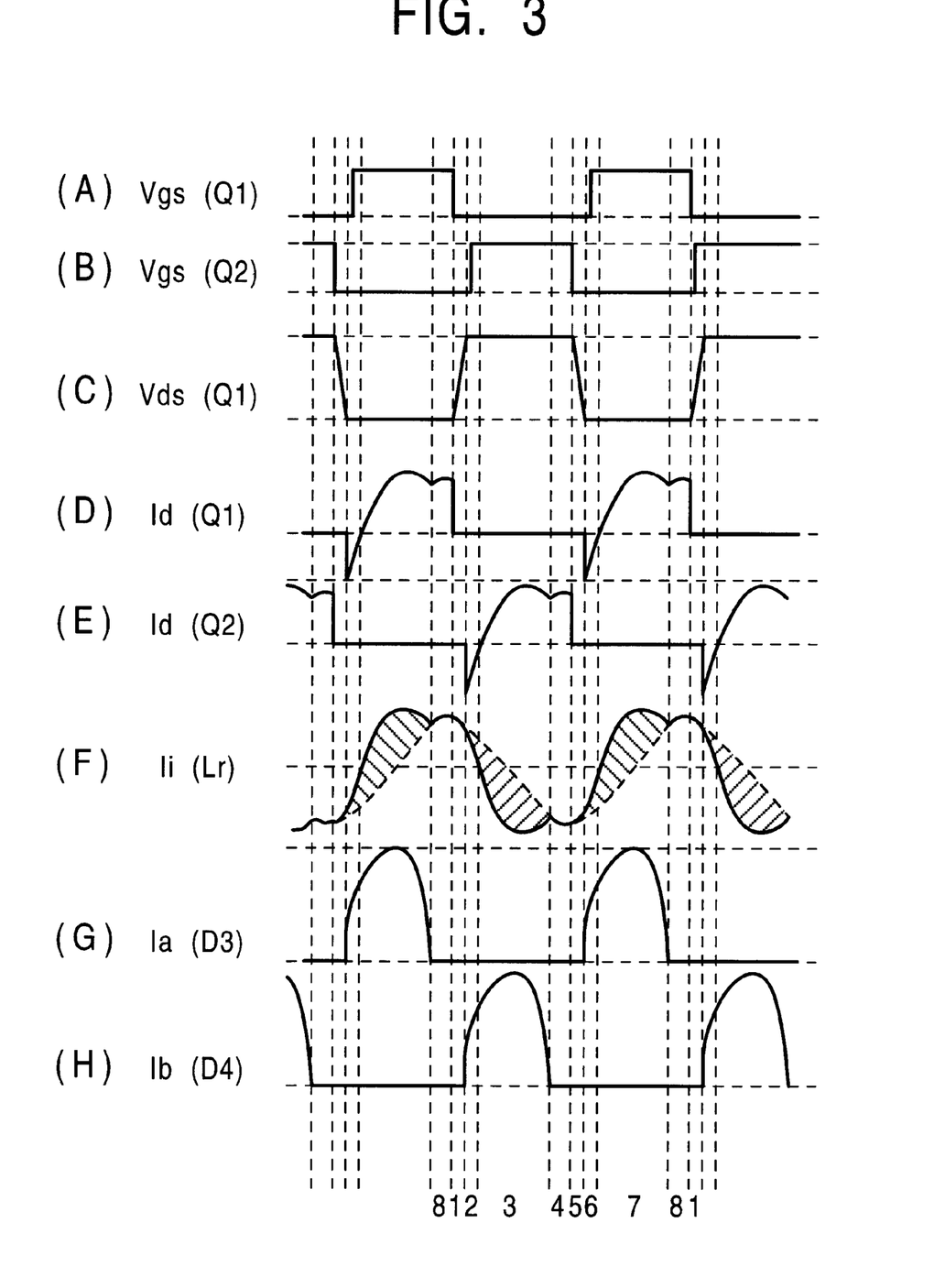
FIG. 3 is a waveform diagram according to the embodiment of the present invention.

FIG. 3 is waveform diagram which illustrates the operation of the components shown in FIG. 1, in which the pair of switching signals Sa and Sb having a duty of approximately 50% allows the pair of transistors Q1 and Q2 to be turned on/off repeatedly. In response to the switching signals Sa and Sb, the drain-source voltage of the first switching transistor Q1 exhibits a waveform shown in (C), and, accordingly, currents Id shown in (D) and (E) are alternately applied to the switching transistors Q1 and Q2, respectively.

A resonant current Ii indicated by the solid line of (F) eventually flows to the resonant inductor Lr.

Using the resonant current Ii, electromagnetic energy is transferred to the secondary of the converter transformer 22 so that a current Ia depicted in (G) flows to the diode D3 when the switching transistor Q1 is turned on, and a current Ib (=Ia) depicted in (H) flows to the diode D4 when the switching transistor Q2 is turned on. The currents Ia and Ib are smoothed and rectified to output a predetermined commutated voltage HV from the smoothing and rectifying circuit 24.

The resonant current Ii depicted in (F) is a combination of the exciting current component depicted by the broken line and the resonant current component depicted by the solid line, with shaded portions defined therebetween representing a component transmitted to the secondary. As described later, the less the exciting current component, the higher the transmission efficiency to the secondary, and the energy conversion efficiency is thus improved.

During heavy loading, as the anode current increases, the high output voltage HV is reduced, and a feedback control is carried out so as to lower the oscillation frequency. This allows a lower switching frequency to be applied to the pair of switching transistors Q1 and Q2, and more electromagnetic energy is thus transferred to the secondary of the converter transformer 22. The high energy transfer increases the high output voltage HV, so that the high output voltage HV can be stabilized during heavy loading.

At a light-load mode where less load is imposed, inversely, the anode current decreases and the high output voltage HV increases. An increase in the high output voltage HV makes the error voltage higher, thus providing a control such that the oscillation frequency may increase. Therefore, the switching frequency increases. An increase in the switching frequency leads to a reduction of the electromagnetic energy transferred to the secondary of the converter transformer 22, to lower the high output voltage HV. Therefore, stabilization in the high output voltage HV is achieved.

In the half bridge DC—DC converter 10 which performs a fundamental operation for voltage stabilization, when the converter transformer 22 is used as a high-voltage conversion transformer, each of the secondary coils 22b and 22c needs to be wound more than the primary coil 22a. Therefore, the secondary coils 22b and 22c parasitically contain the interwinding capacitances Cs1 and Cs2, respectively.

As known in the art, in the primary, the interwinding capacitances or parasitic capacitances Cs1 and Cs2 would be equivalent to the interwinding capacitance which is connected in parallel to the primary coil 22a. The equivalent capacitance which is indicated by Cp shown by a broken line in FIG. 1 would be connected in parallel to the inductor LP. Accordingly, the resonance characteristic of the resonant circuit 20 is a combination of a series resonance characteristic of a series resonant portion comprising the capacitor Cr, and the inductors Lr and LP and a parallel resonance characteristic of a parallel resonant portion comprising the inductors Lr and Lp, and the equivalent capacitance Cp.

Figure 4A:
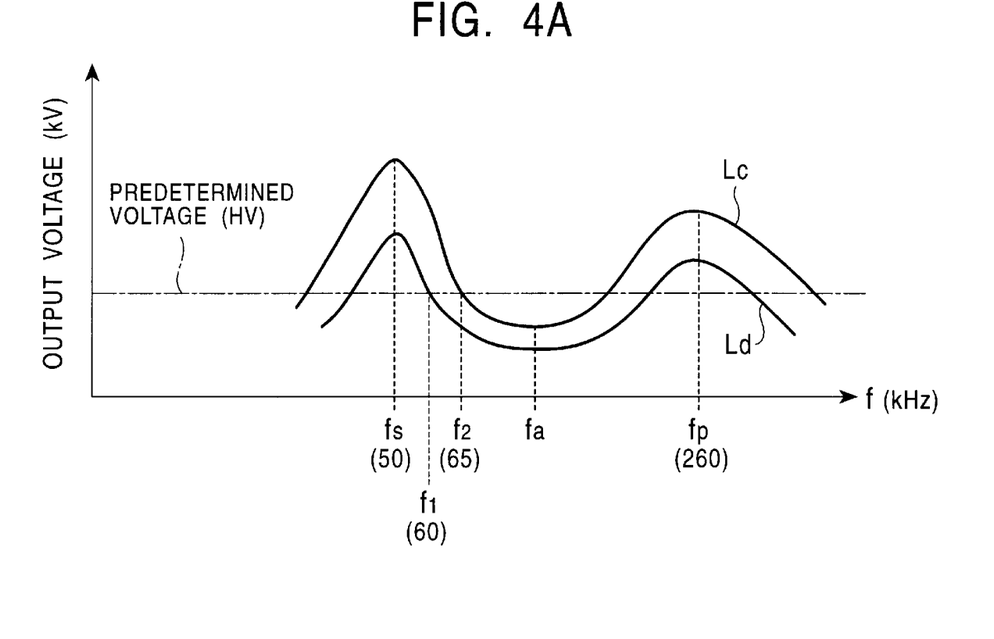
FIGS. 4A and 4B are graphs showing the relationship between the resonant frequencies and output voltages according to the embodiment of the present invention.

As depicted in FIG. 4A, the resonance characteristic between the switching frequency and the output voltage of the smoothing and rectifying circuit 24 provides a twin-peak relationship in which a series resonance curve having a first resonant point Ps is combined with a parallel resonance curve having a second resonant point Pp. In FIG. 4A, a curve Lc represents the resonance characteristic during light loading, and a curve Ld represents the resonance characteristic during heavy loading.

If an output voltage HV for stabilization is set at a predetermined voltage shown in FIG. 4A, switching frequencies f1 and f2 corresponding to intersections between the predetermined voltage and the resonance curves Lc and Ld, respectively, become operational frequencies when the output voltage HV is stabilized. As the load varies, the resonance curve varies in a range of Lc to Ld according to the load variations. Therefore, desirably, the switching frequency to stabilize the output voltage varies in a range of f1 to f2.

In the present invention, the switching frequency to provide a stabilized output voltage during light loading is set at the frequency f2 more than the parallel resonant frequency fp. Specifically, the interwinding capacitances Cs1 and Cs2 of the secondary coils 22b and 22c, namely, the equivalent capacitance Cp, are chosen so that the switching frequency when the output voltage is stabilized is set at the frequency f2 more than the parallel resonant frequency fp which is defined by the interwinding capacitances Cs1 and Cs2, etc. The parallel resonant point Pp or the parallel resonant frequency varies depending upon the equivalent capacitance Cp, and as the value thereof increases, the parallel resonance curve changes. Thus, a change in the series resonance curve and the parallel resonance curve also influences the curve in the vicinity of the bottom.

Figure 4B:
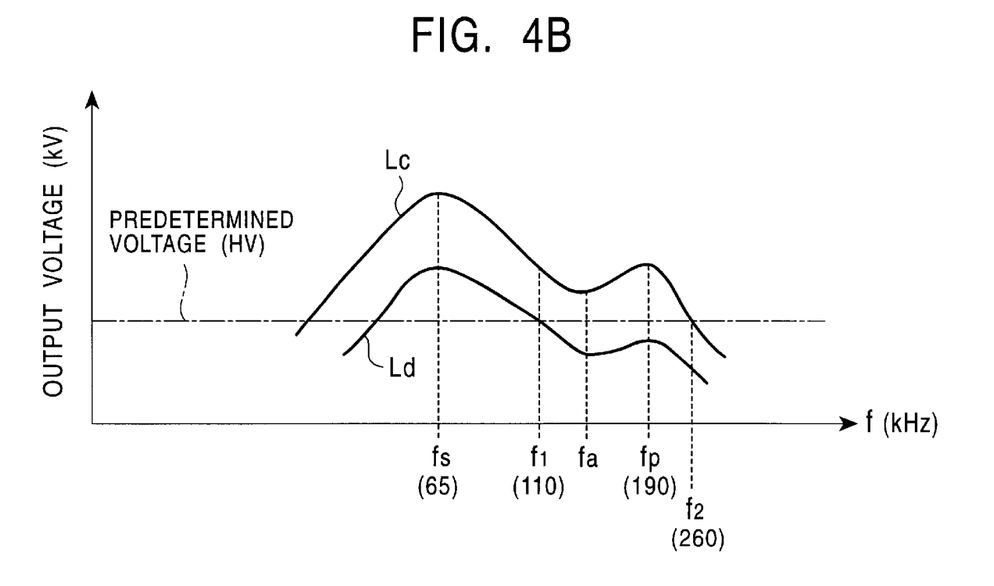

As the equivalent capacitance Cp gradually increases from the state shown in FIG. 4A, the resonance characteristic curve Lc exhibits that the bottom of the resonance characteristic, or the frequency fa, is shifted above and exceeds the predetermined voltage HV, as shown in FIG. 4B. Due to this shift, there is only one frequency corresponding to the intersection between the resonance characteristic curve Lc and the predetermined voltage HV, so that the frequency f2 more than the parallel resonant frequency fp can be thus set as the switching frequency to stabilize the output voltage, as previously described.

According to a change in the equivalent capacitance Cp, the resonance characteristic during heavy loading also varies such as from the curve Ld shown in FIG. 4A to the curve Ld shown in FIG. 4B. Hence, the switching frequency f1 to stabilize the output voltage during heavy loading is also shifted to a higher frequency region.

The equivalent capacitance Cp, provided that the interwinding capacitances Cs1 and Cs2 of the secondary coils 22b and 22c are present in the primary, depends upon the turns ratio of the primary coil 22a to the secondary coils 22b and 22c.

For example, it is assumed that a high output voltage is set at 32 kV which is the predetermined voltage HV, and the switching frequency is variable in a range of 100 kHz to 260 kHz. If the total turns of the secondary coils 22b and 22c are 500 T, and the turns of the primary coil 22a are 30 T, then, the resonance characteristic having the curves Lc and Ld as shown in FIG. 4A is obtained.

Meanwhile, the resonance characteristic if the turns of the primary coil 22a are half the original, namely, 15 T, is shown in FIG. 4B. Reducing the turns of the primary coil 22a by half the original essentially implies that the equivalent capacitance Cp is substantially doubled. In this case, therefore, the resonance characteristic has a profile shown by the curve Lc during light loading, and the resonance characteristic has a profile shown by the curve Ld during heavy loading. Accordingly, the series resonant point Ps and the parallel resonant point Pp are also shifted to higher frequency regions. An experiment reported that the resonant frequencies fs, f1, fa, fp, and f2 were 65 kHz, 110 kHz, 155 kHz, 190 kHz, and 260 kHz, respectively, as shown in FIG. 4B.

Furthermore, as is apparent from FIG. 4B, the switching frequency f1 during heavy loading when the resonance curve Ld intersects the predetermined voltage HV is 110 kHz, and the switching frequency f2 during light loading when the resonance curve Lc intersects the predetermined voltage HV is 260 kHz. It should be noted that the switching frequencies f1 and f2 are 60 kHz and 65 kHz, respectively, in the graph shown in FIG. 4A.

According to the present invention, therefore, the switching frequency f2 to stabilize the output voltage during light loading can be significantly increased more than usual.

Meanwhile, the amplitude Irpp of the exciting current component which flows to the primary coil 22a is expressed as follows.

$$Irpp = HV / \{2 \cdot f2 \cdot \sqrt{Lp \cdot Ls1}\}$$

where Ls1 denotes the inductance of the secondary coil 22b. As is seen from the above expression, the amplitude of the exciting current is inversely proportional to the switching frequency f2.

Therefore, if the switching frequency f2 is shifted to a higher frequency region, such as 260 kHz, the exciting current component can be reduced to approximately one quarter the case where the switching frequency f2 is 65 kHz.

As a result, the energy conversion efficiency of the converter transformer 22 is significantly improved more than usual by on the order of 6 to 7 W, as was observed in an experiment.

Components which define the resonance curves Lc and Ld include the series resonant capacitor Cr, the resonant inductors Lr and Lp, and the equivalent capacitor Cp shown in FIG. 1, and only the equivalent capacitance Cp may be changed or, otherwise, the values of any other components may be changed to obtain the resonance characteristic shown in FIG. 4B.

The primary coil 22a and the secondary coils 22b and 22c of the converter transformer 22 may be loosely coupled, with the leakage inductance being used as the resonant inductance Lr.

Figure 5:
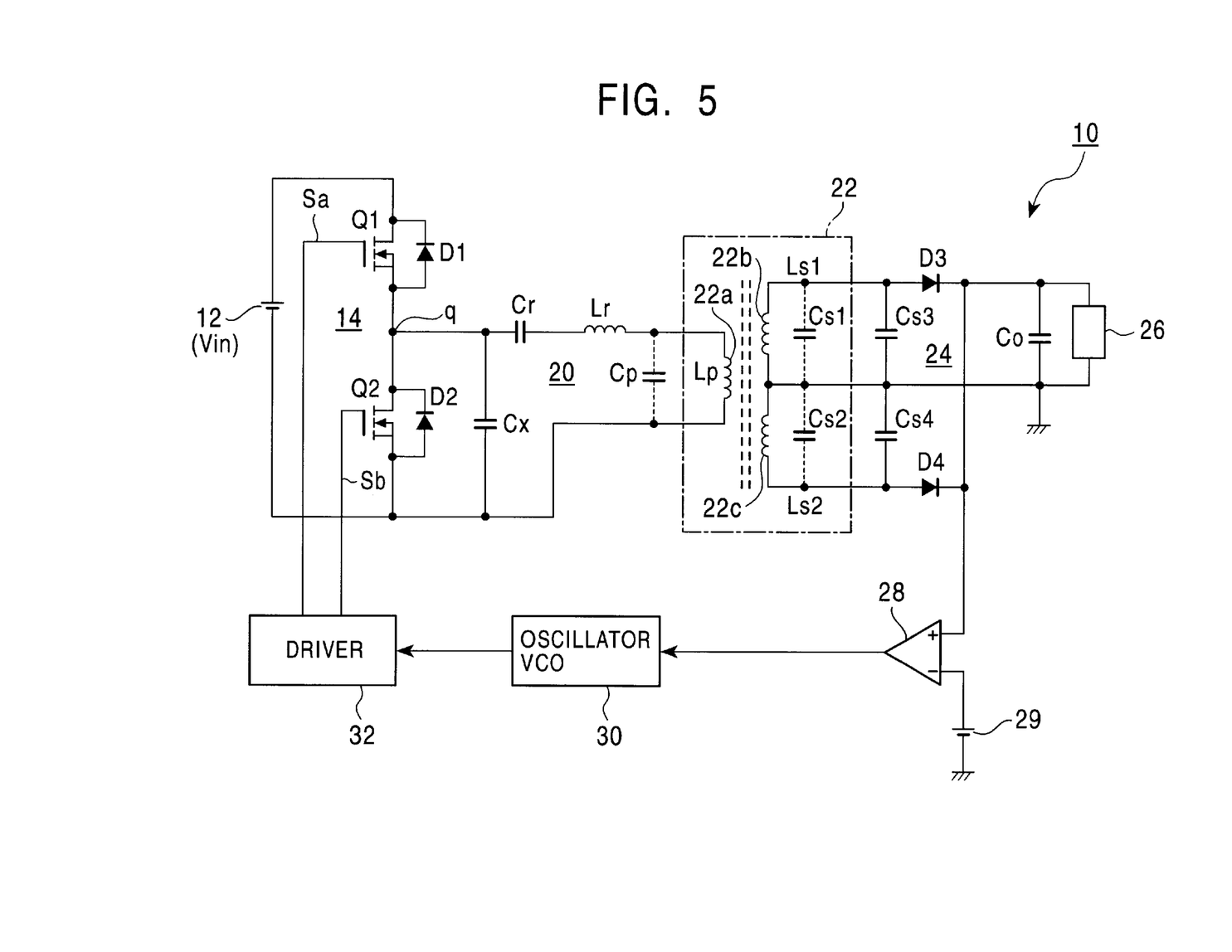
FIG. 5 is a schematic diagram of a bridge DC—DC converter according to another embodiment of the present invention.

FIG. 5 shows another embodiment of the bridge DC—DC converter 10 according to the present invention.

In this manner, the operational frequency during light loading is set at the frequency f2 more than the resonant frequency fp which is mainly defined by the inductance Lp of the primary coil 22a, and the interwinding capacitances Cs1 and Cs2 of the secondary coils 22b and 22c of the converter transformer 22. However, the interwinding capacitances Cs1 and Cs2 may not provide sufficient capacitance, and the resonance characteristic in which the output voltage at the frequency fa in the vicinity of bottom exceeds the predetermined voltage HV may not be expected. This inconvenience is overcome by an embodiment illustrated with reference to FIG. 5.

Referring to FIG. 5, auxiliary capacitors Cs3 and Cs4 are added to the secondary coils 22b and 22c of the transformer 22, respectively. The equivalent capacitance Cp which is present in the primary would thus increase, providing the resonance characteristic as depicted by the curve Lc in FIG. 4B that the output voltage level in the vicinity of the bottom frequency fa exceeds the predetermined voltage HV. Other structure is the same as that in FIG. 1, and a description thereof is therefore omitted.

The smoothing and rectifying circuit 24 may be configured according to the output voltage. Therefore, a half-wave rectifying circuit or a voltage multiplier rectifier circuit may be employed as alternatives.

Although the present invention is embodied as a half bridge DC—DC converter in the illustrated embodiments, it may also be embodied as a full bridge DC—DC converter. Furthermore, although a typical DC—DC converter is implemented in the present invention, the present invention may also be applied to high voltage generating circuits for use in CRTs, as is readily anticipated by those skilled in the art.

If a high voltage generating circuit for use in CRTs is used instead of a DC—DC converter such as a half bridge DC—DC converter, it uses the switching frequency which is asynchronous with the horizontal scanning frequency to stabilize the high output voltage, so that the ripple (switching frequency component) of the output voltage may appear on a screen in the form of undesired horizontal fringes. One possible solution is to insert a resistor useful to suppress the ripple in series into the transmission path of the output voltage.

What is claimed is:

1. A DC—DC converter comprising:
switching means having a pair of switching devices connected in series to form a bridge;
a converter transformer having a primary coil and a secondary coil which are wound with a predetermined turns ratio for transferring to the secondary coil the switching output provided for the primary coil by the switching operation of said switching means;
series resonant means having a capacitor, an inductor, and the primary coil serving as an inductor which are connected in series to a node between the pair of switching devices, said series resonant means being resonated at a first resonant frequency;
parallel resonant means at least having an equivalent capacitance in the primary equivalent to the interwinding capacitance of the secondary coil, and the inductance of the primary coil, said parallel resonant means being resonated at a second resonant frequency higher than the first resonant frequency;
voltage supply means connected to the secondary coil serving as a source for supplying an output voltage to a load; and
switching control means for varying the switching frequency of said switching means according to variations in the voltage output from said voltage supply means.

2. A DC—DC converter comprising:
switching means having a pair of switching devices connected in series to form a bridge;
a converter transformer having a primary coil and a secondary coil which are wound with a predetermined turns ratio for transferring to the secondary coil the switching output provided for the primary coil by the switching operation of said switching means;
series resonant means having a capacitor, an inductor, and the primary coil serving as an inductor which are connected in series to a node between the pair of switching devices, said series resonant means being resonated at a first resonant frequency;
parallel resonant means at least having an equivalent capacitance in the primary equivalent to the interwinding capacitance of the secondary coil, and the inductance of the primary coil, said parallel resonant means being resonated at a second resonant frequency higher than the first resonant frequency;
voltage supply means connected to the secondary coil serving as a source for supplying an output voltage to a load;

error detecting means for detecting variations in the output voltage from said voltage supply means;
variable oscillating means for varying the switching frequency of said switching means according to the detected variations; and
switching drive means for alternately turning on and off the pair of switching devices according to the switching frequency,
whereby the output voltage is stabilized.

3. A DC—DC converter according to claim 1 or 2, wherein the turns ratio of the primary coil to the secondary coil is chosen so that the switching frequency is in a range of the first resonant frequency to the second resonant frequency during heavy loading, and exceeds the second resonant frequency during light loading, in order to stabilize the output voltage.

4. A DC—DC converter according to claim 3, further comprising a capacitor connected in parallel to the secondary coil, wherein the switching frequency is defined by changing the capacitance of said capacitor and the turns ratio of the primary coil to the secondary coil.

5. A high voltage generating circuit comprising:
switching means having a pair of switching devices connected in series to form a bridge;
a converter transformer having a primary coil and a plurality of secondary coils which are wound with a predetermined turns ratio for transferring to the plurality of secondary coils the switching output provided for the primary coil by the switching operation of said switching means;
series resonant means having a capacitor, an inductor, and the primary coil serving as an inductor which are connected in series to a node between the pair of switching devices, said series resonant means being resonated at a first resonant frequency to provide current resonance for the switching operation;
parallel resonant means at least having an equivalent capacitance in the primary equivalent to a combination of the interwinding capacitances of the plurality of secondary coils, and the inductance of the primary coil, said parallel resonant means being resonated at a second resonant frequency higher than the first resonant frequency;
high voltage supply means for coupling a voltage multiplier rectifier circuit to each of the plurality of secondary coils so as to connect them in series so that a high voltage is supplied to a load; and
switching control means for varying the switching frequency of said switching means according to variations in the high voltage output from said high voltage supply means,
whereby the high voltage output is stabilized.

6. A high voltage generating circuit comprising:
switching means having a pair of switching devices connected in series to form a bridge;
a converter transformer having a primary coil and a plurality of secondary coils which are wound with a predetermined turns ratio for transferring to the plurality of secondary coils the switching output provided for the primary coil by the switching operation of said switching means;
series resonant means having a capacitor, an inductor, and the primary coil serving as an inductor which are connected in series to a node between the pair of switching devices, said series resonant means being resonated at a first resonant frequency to provide current resonance for the switching operation;

parallel resonant means at least having an equivalent capacitance in the primary equivalent to a combination of the interwinding capacitances of the plurality of secondary coils, and the inductance of the primary coil, said parallel resonant means being resonated at a second resonant frequency higher than the first resonant frequency;

high voltage supply means for coupling a voltage multiplier rectifier circuit to each of the plurality of secondary coils so as to connect them in series so that a high voltage output is supplied to a load;

error detecting means for detecting variations in the high voltage output from said high voltage supply means;

variable oscillating means for varying the switching frequency of said switching means according to the detected variations; and switching drive means for driving the pair of switching devices according to the switching frequency, whereby the high voltage output is stabilized.

7. A high voltage generating circuit according to claim 5 or 6, wherein the turns ratio of the primary coil to the plurality of secondary coils is chosen so that the switching frequency is in a range of the first resonant frequency to the second resonant frequency during heavy loading, and exceeds the second resonant frequency during light loading, in order to stabilize the high voltage output.

* * * * *